United States Patent [19]

Flynn

[11] 3,849,678

[45] Nov. 19, 1974

[54] DETECTOR ARRAY

[75] Inventor: John Flynn, Belmont, Mass.

[73] Assignee: Honeywell Inc., Minneapolis, Minn.

[22] Filed: Oct. 12, 1973

[21] Appl. No.: 405,836

[52] U.S. Cl. .............. 307/311, 307/304, 317/235 N, 317/235 G, 307/251, 307/218, 340/166 R

[51] Int. Cl. .............. H01l 15/00

[58] Field of Search .... 317/235 N, 235 G; 307/311, 307/304, 251, 218; 340/166 R

[56] References Cited

UNITED STATES PATENTS

| | | | |
|---|---|---|---|
| 3,465,293 | 9/1969 | Wickler | 340/166 |
| 3,593,067 | 7/1971 | Flynn | 317/234 R |
| 3,624,428 | 11/1971 | Wermer | 307/311 |
| 3,700,961 | 10/1972 | Fletcher | 315/169 TV |
| 3,781,806 | 12/1973 | Mizushima | 340/166 R |

*Primary Examiner*—Martin H. Edlow
*Attorney, Agent, or Firm*—Charles J. Ungemach; Albin Medved; John S. Munday

[57] ABSTRACT

An improved photodetector array in which each element of the array is provided with an integral pair of MOSFET switches, so that scanning of the m by n array can be accomplished with only m + n conductors leading from the array to scanning circuitry: an integral discrete capacitor is also included to augment the capacitance inherent in the PN junction of each diode element.

8 Claims, 19 Drawing Figures

PATENTED NOV 19 1974 3,849,678

SHEET 1 OF 7

DETECTOR ARRAY

BACKGROUND OF THE INVENTION

This invention comprises an improvement on the invention described in my U.S. Pat. No. 3,593,067 issued on July 13, 1971 and assigned to the assignee of the present invention. The patent describes an array of radiation detectors including a wafer of semiconductor material having a PN junction near one surface, and having a grid of intersecting grooves dividing the opposite surface into a plurality of distinct photodiode elements. The grooves are not sufficiently deep to penetrate the PN junction physically, but application of proper bias broadens the depletion layer associated with the PN junction until the grooves do penetrate it, thus isolating the elements electrically from one another. When radiation thereafter falls on the first named surface, the effective resistance of each element is representative of the energy falling on the portion of the irradiated surface opposite thereto, and electrical signals may be derived therefrom.

An important use of detector arrays requires "scanning" or sampling the signals from the elements in a predetermined sequence, to provide a set of outputs representative thereof for use at some remote point to perform a display or control function. Each photodiode acts as a resistor shunting a capacitor, the resistance decreasing with increasing irradiation of the diode. If such a combination is connected to a voltage source, the capacitor charges practically instantaneously. Upon disconnection of the source the capacitor discharges through the resistor at a rate determined by the incident light. Thus the recharging current at the end of a standard interval is a measure of the light falling on the detector. Since all the photodetectors in an array have a common anode, it is possible to use a common load resistor, the measuring circuit being completed successively to the several diodes to perform the scanning function.

In an array is $m$ elements long and $n$ elements wide, it is necessary to connect $(m \times n)$ conductors to the back of the array to permit scanning of the complete array. For an array 50 elements long and 50 elements wide, for example, this means that 2,500 conductors must be brought into a very restricted space, raising practical problems of a very high order.

SUMMARY OF THE INVENTION

The present invention uses solid state technology to make a pair of MOSFET switches integral with each element of the array. Proper cross connection of the diodes by columns or rows under the control of these switches can be accomplished with only $(m + n)$ conductors: in the illustrative case of the $50 \times 50$ element array this means 100 conductors rather than 2,500.

At the same time, a discrete capacitor is also integrated into each detector, again by solid state technology, to increase the output range available for signal use.

It is a principal object of this invention to increase the usefulness of photodetector arrays, by reducing the number of conductors required to connect the array with the associated scanning circuitry and by making suitable switching elements integral with the photodiodes, as well as to increase the output signal range by the addition of integrated discrete capacitors.

Various other objects, advantages, and features of novelty which characterize my invention are pointed out with particularity in the claims annexed hereto and forming a part thereof. However, for a better understanding of the invention, its advantages, and objects attained by its use, reference should be had to the drawing which forms a further part hereof, and to the accompanying descriptive matter, in which there is illustrated and described a preferred embodiment of the invention.

In the drawing

Figure 1:
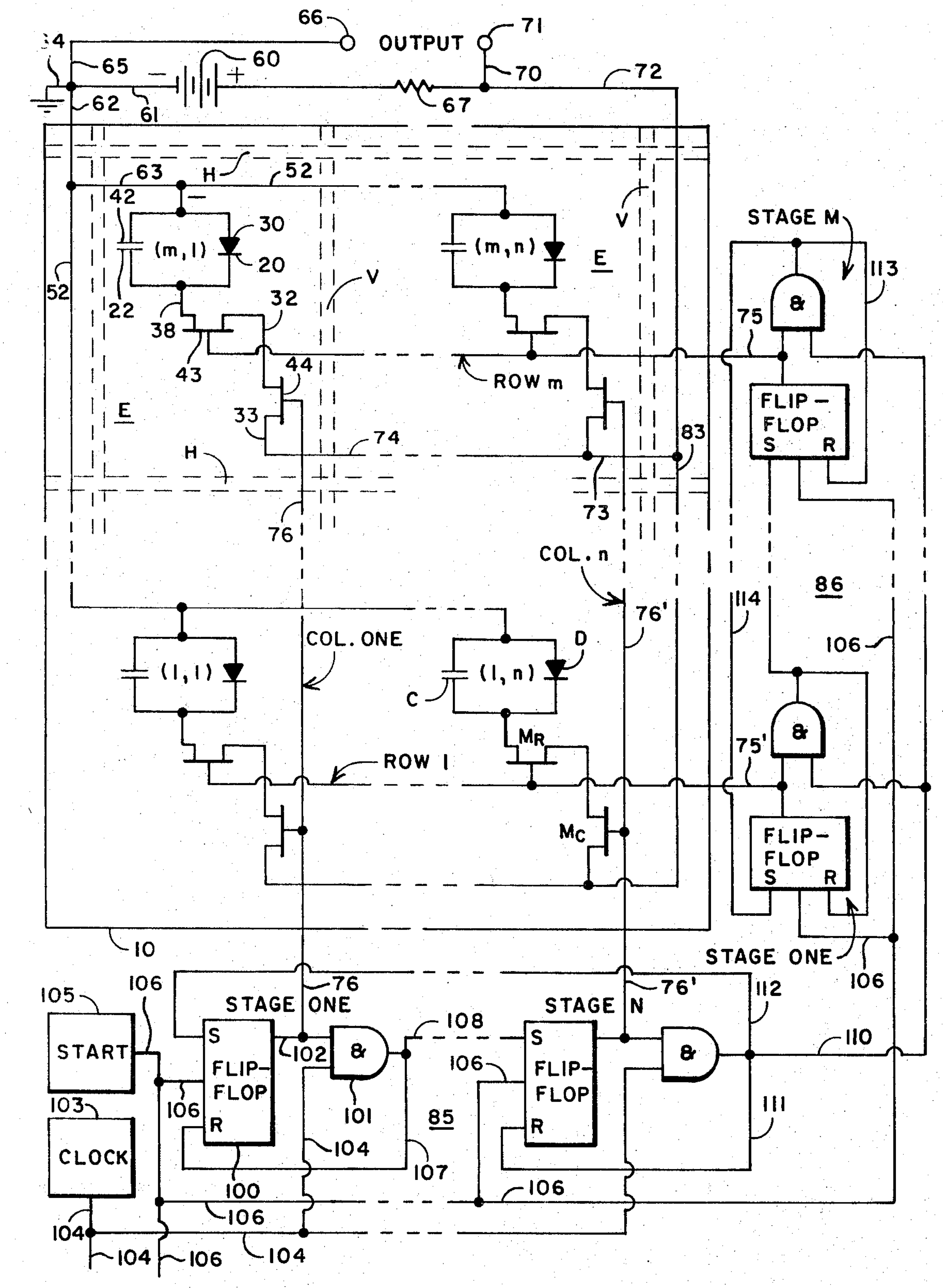
FIg. 1 is a schematic showing of an array according to the invention.

Turning first to FIG. 1, the reference numeral 10 identifies a wafer of silicon divided by horizontal grooves H and vertical grooves V into a rectangular array of photodiode elements E which may conveniently be 5 mils by 5 mils in area. By way of illustration, the figure suggests an array of $m$ rows and $n$ columns of elements, although square arrays or arrays of other suitable configurations can be accomplished by proper arrangements of grooves.

The wafer has a PN junction near the front surface thereof so that the elements E can function, when suitably biased, as a plurality of independent photodiodes D having a common anode, each exhibiting a leakage resistance R determined by the amount of radiant energy which it receives.

Figure 2:
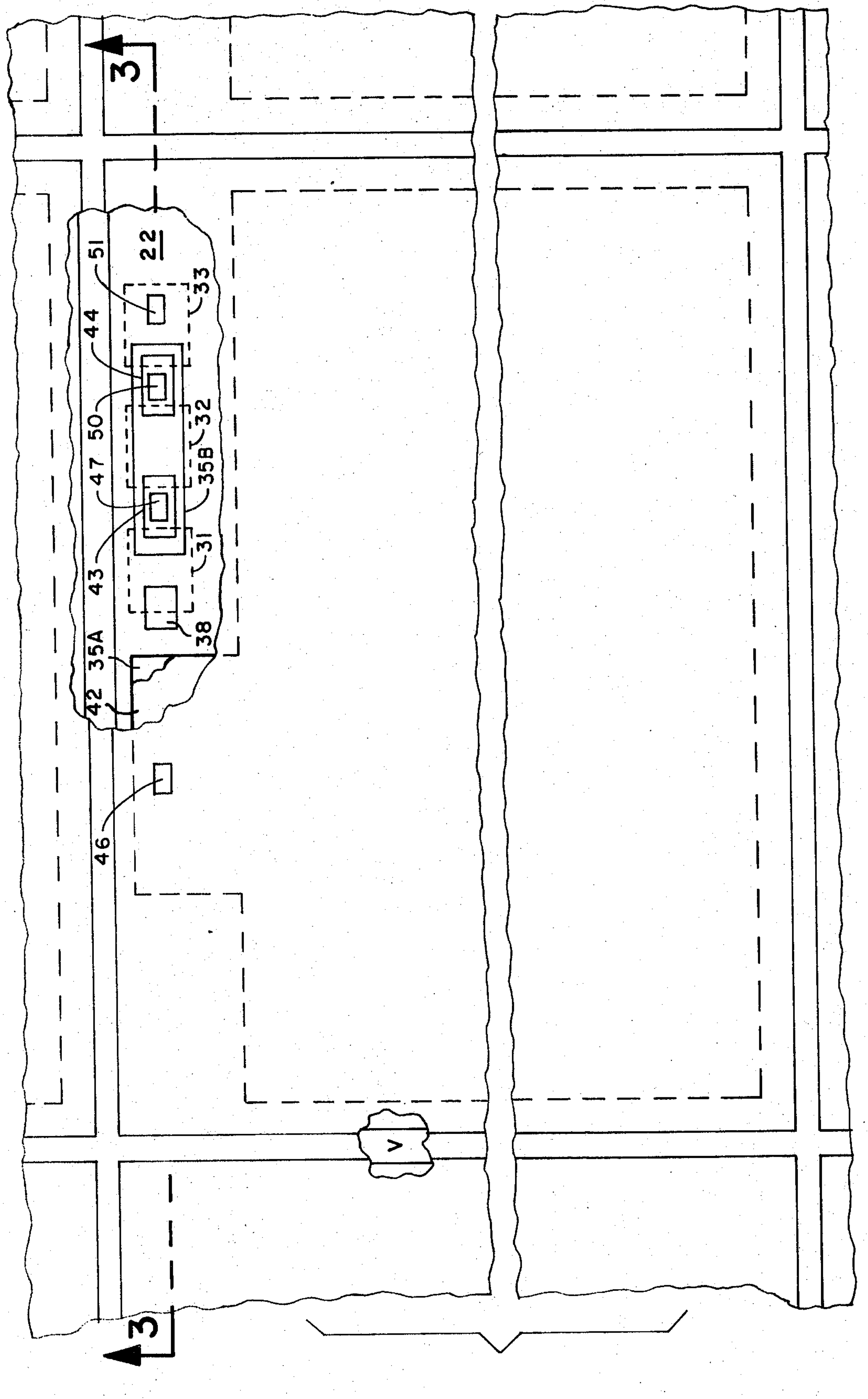
FIG. 2 is an enlarged showing of a single photodiode element with my invention embodied therein, and FIGS. 3A to 3Q inclusive show the steps of a preferred process for producing an array according to FIGS. 1 and 2.

It is well known that a photodiode also has an effective capacitance: the present invention augments these capacitances by incorporating further discrete capacitors C into the elements, as will be described below. Also incorporated into each element are a pair of metal oxide semiconductor field effect transistors (MOSFET's) $M_R$ and $M_C$ of the enhancement type. FIG. 2 is a view of one such element seen from the back, that is, the surface upon which the radiation of interest does not impinge.

Before discussing the systems aspects of the invention in more detail, the steps in the manufacture of an array suitable for the purpose will be described, referring now to FIG. 3.

Figure 3A:
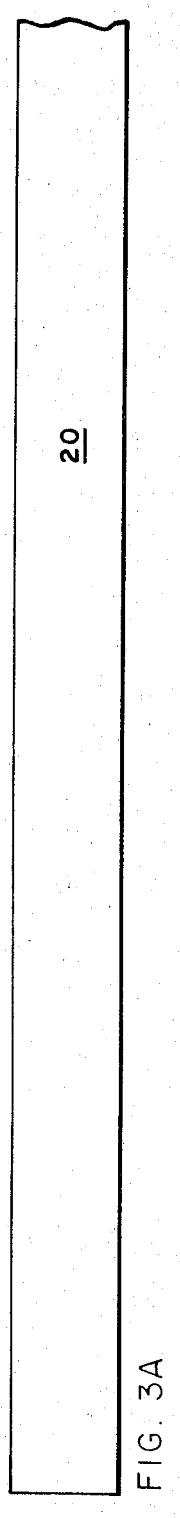

FIG. 3A shows the initial chip 20 of slightly N-type silicon. Throughout FIG. 3, the upper surface is the one which is to be the front of the wafer, upon which the incident radiation is to fall.

Figure 3B:
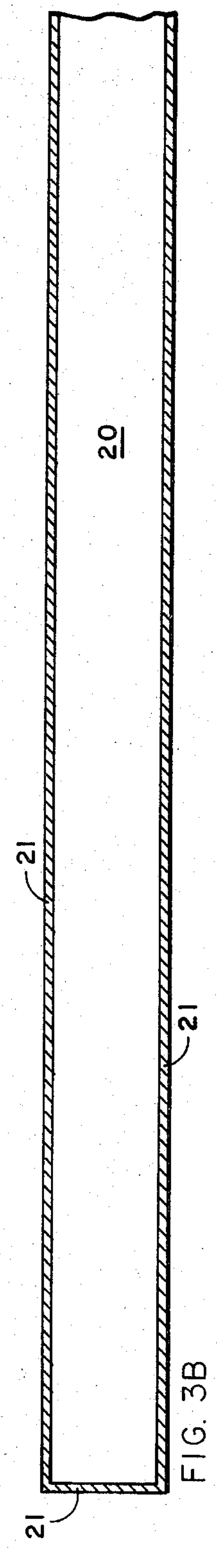
Figure 3C:
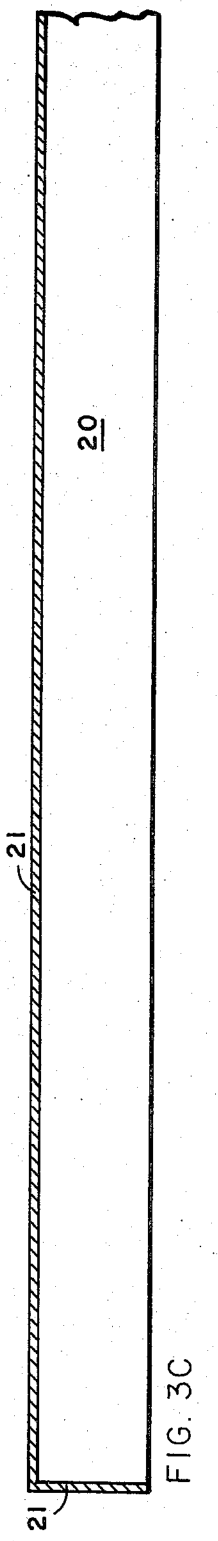
Figure 3D:
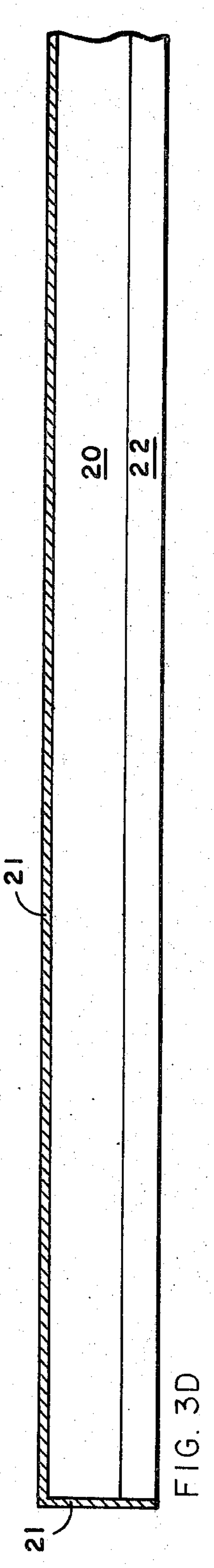

The first manufacturing step, FIG. 3B, is to cover the entire surface of the chip with an oxide layer 21. The back surface is then stripped of oxide, FIG. 3C, and subjected to a deep diffusion of phosphorous, FIG. 3D, to produce a heavily doped N+ layer 22 which will be common to all the elements.

Figure 3E:
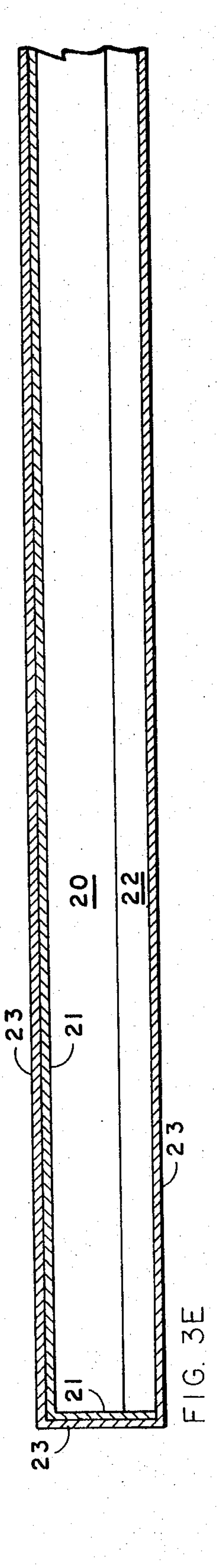
Figure 3F:
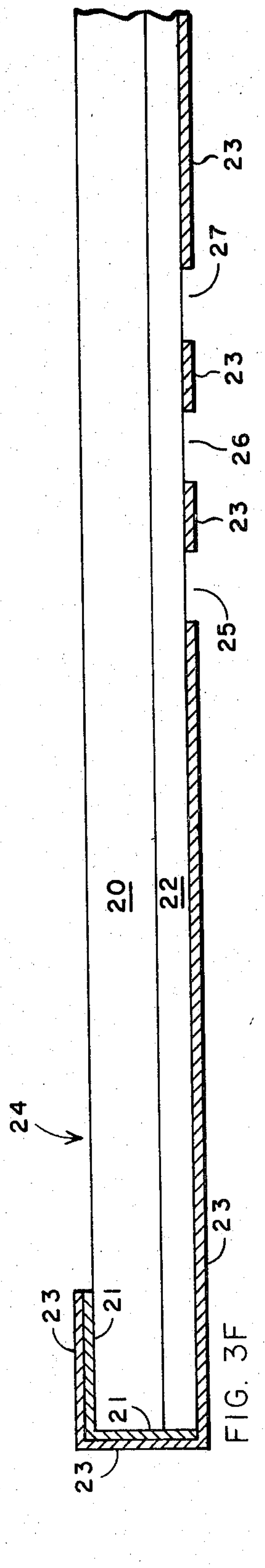

The wafer is next reoxidized, FIG. 3E, to provide a protective layer 23 over the N+ and, of course, all over the wafer, and windows are cut through the oxide to the silicon both front and back, FIG. 3F. The window 24 in front includes the entire working area of the array, except for a margin around the outside. Three windows 25, 26, and 27 are cut in the back for each element, or a total of $3mn$ windows for an $m \times n$ array.

Figure 3G:
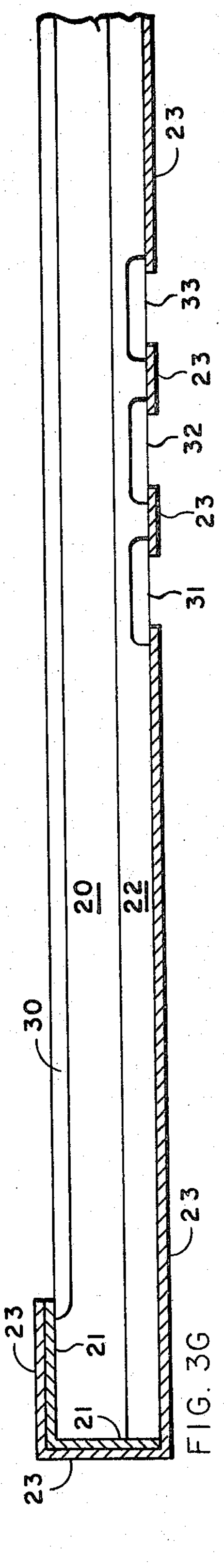
Figure 3H:
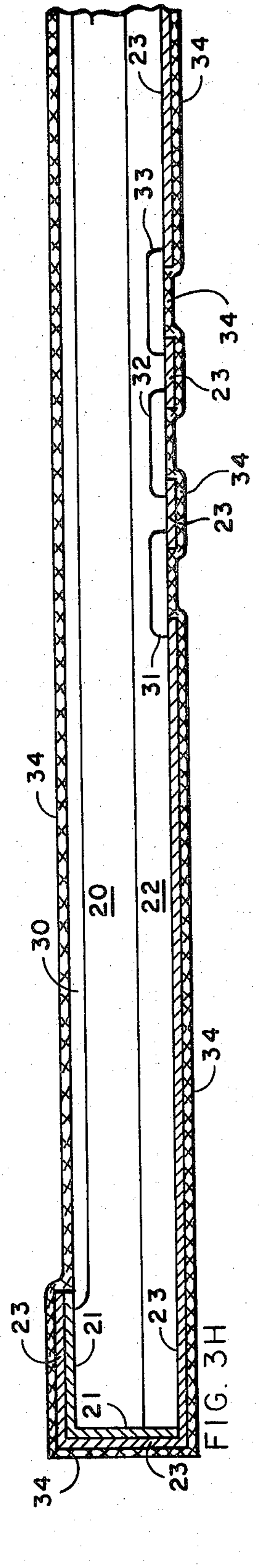
Figure 3M:
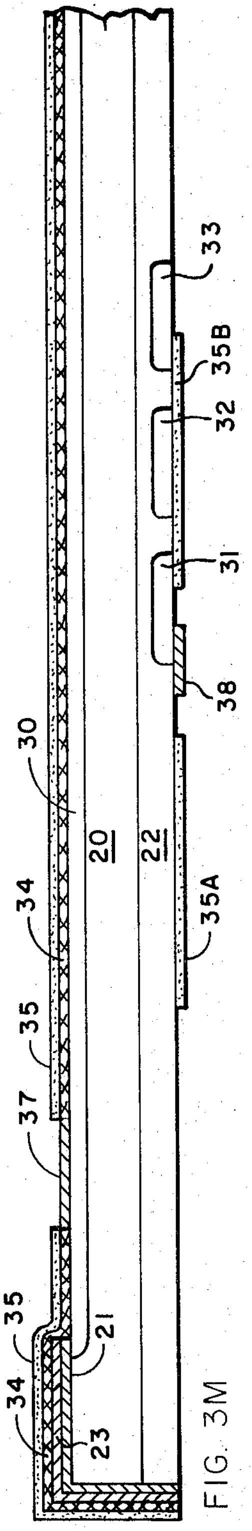

The wafer is subjected through windows 24–27 to a shallow diffusion of boron, FIG. 3G, to produce an anode 30 of P+ material, common to all the elements, and three P+ areas 31, 32, and 33 for each element, which are to cooperate with N+ layer 22 to comprise the desired MOSFET's. This is followed, FIG. 3H, by a reoxidation to provide a protective layer 34 for the common anode. The oxide layers are then stripped off the back, FIG. 3I, and a thinner (1,000A) layer of oxide 35 is applied, FIG. 3J. The reason for this circuitous procedure is that the layer 35 is intended to act as a capacitor dielectric, and must be thinner than desirable for simple protection purposes.

Figure 3N:
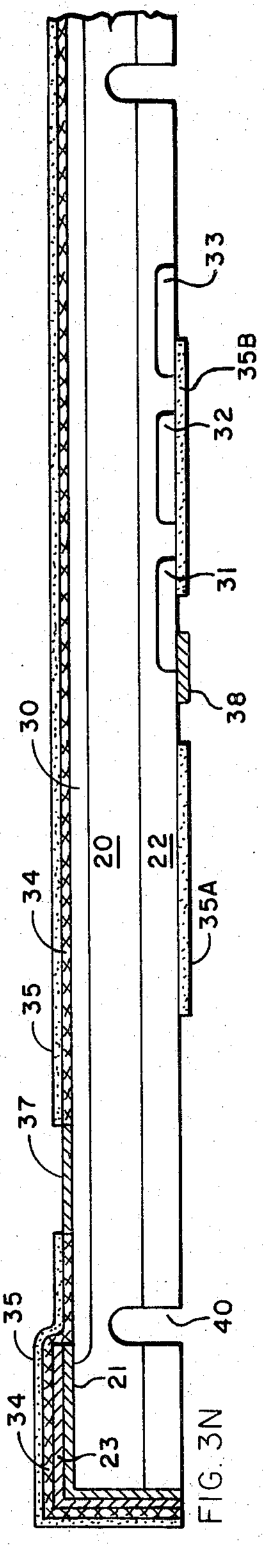
Figure 3P:
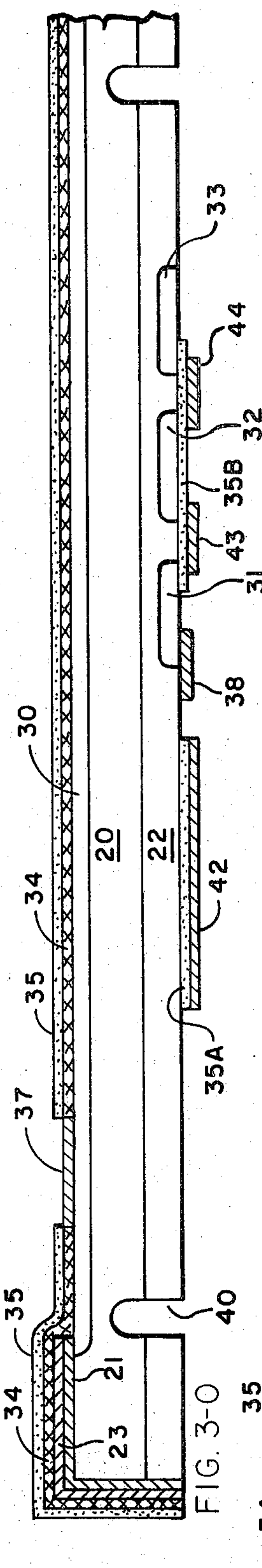
Figure 3P:
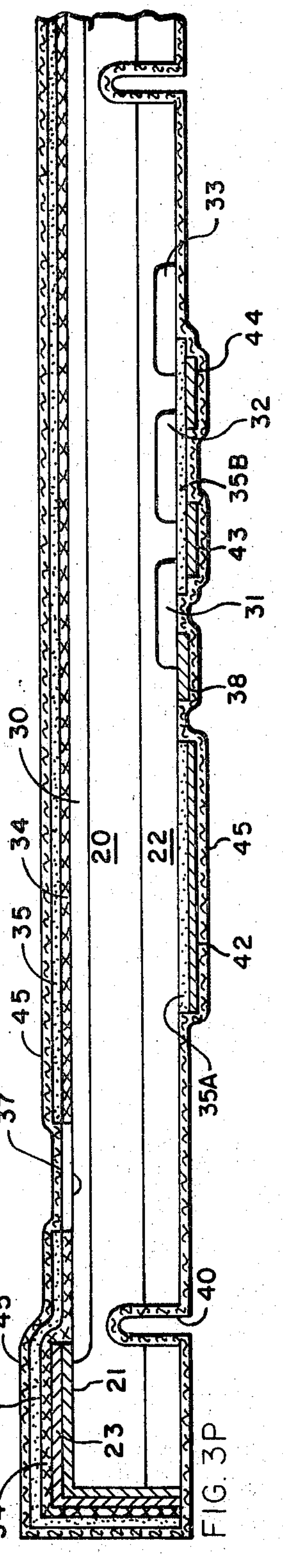
Figure 3Q:
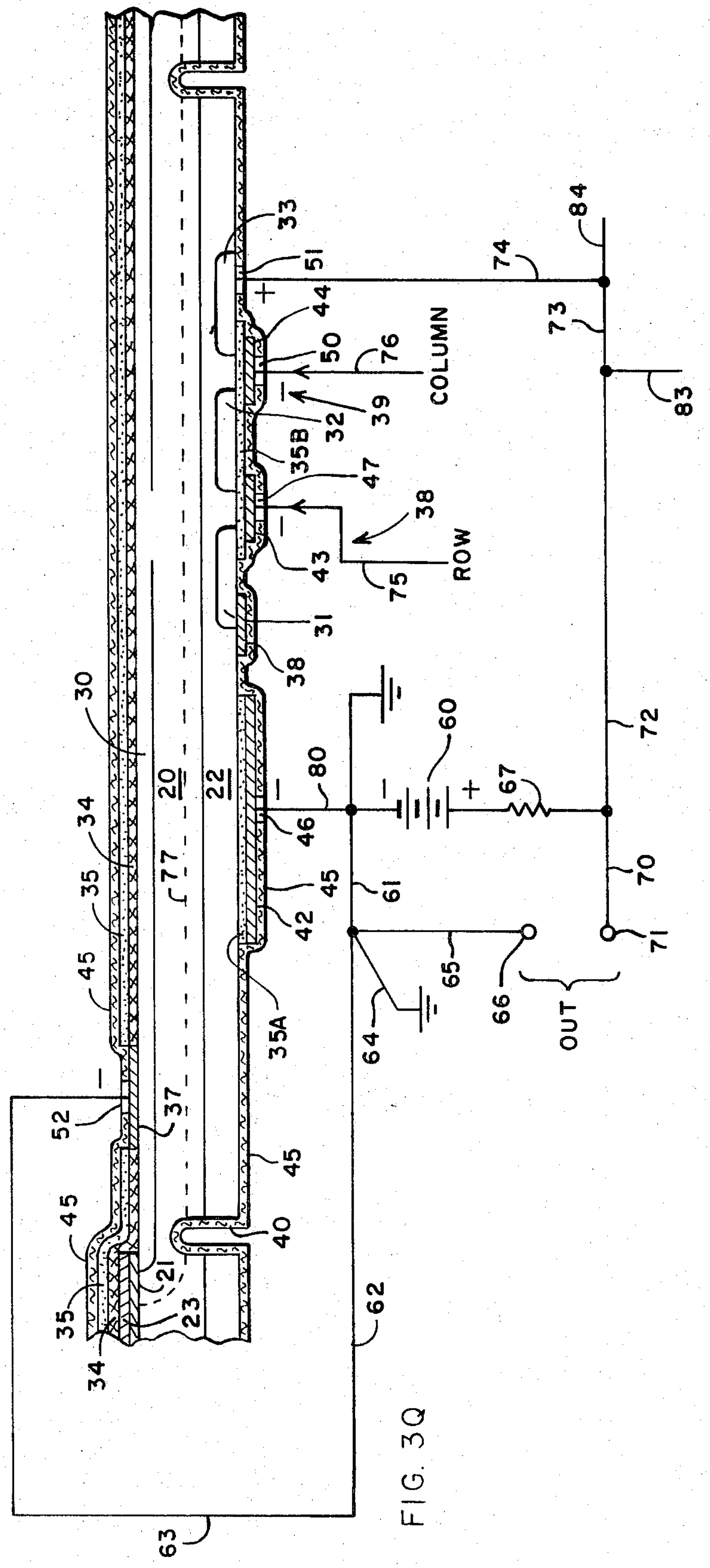
Figure 3J:
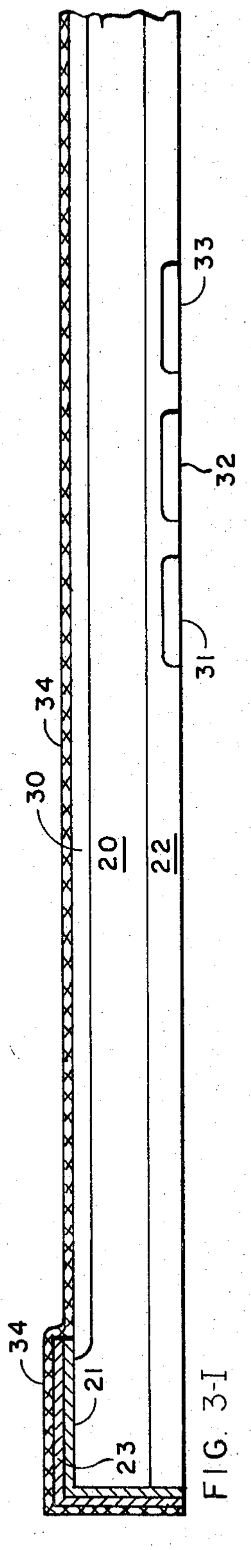
Figure 3J:
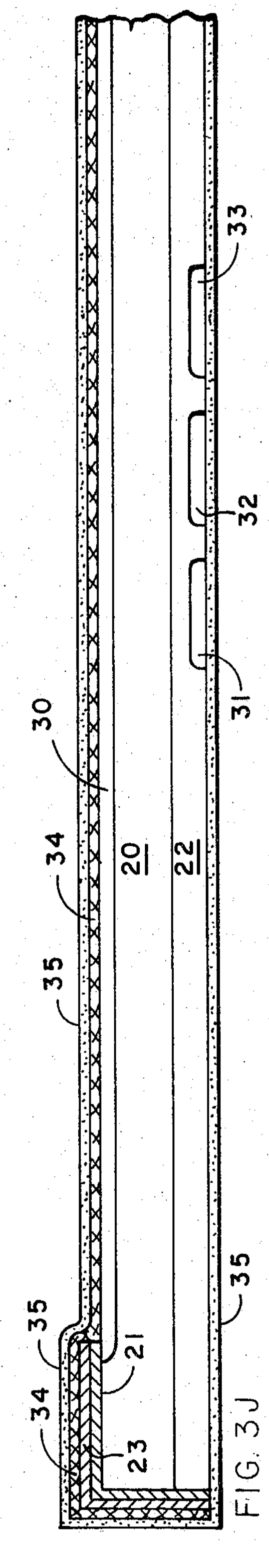
Figure 3K:
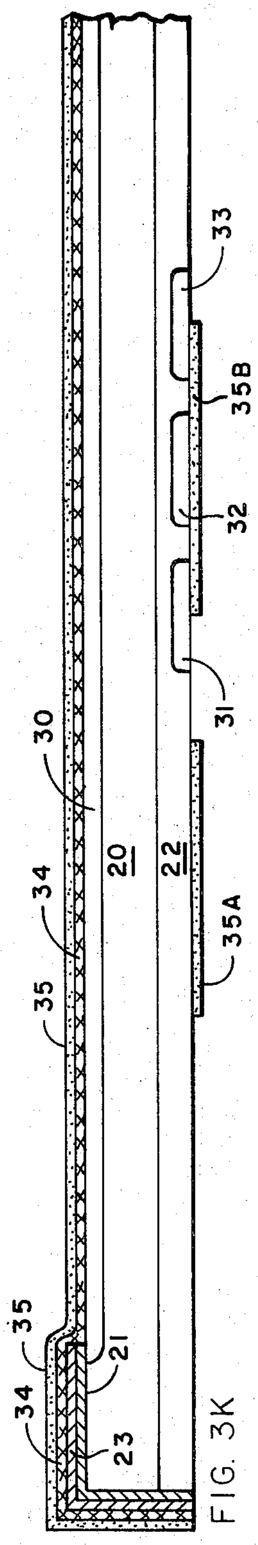
Figure 3L:
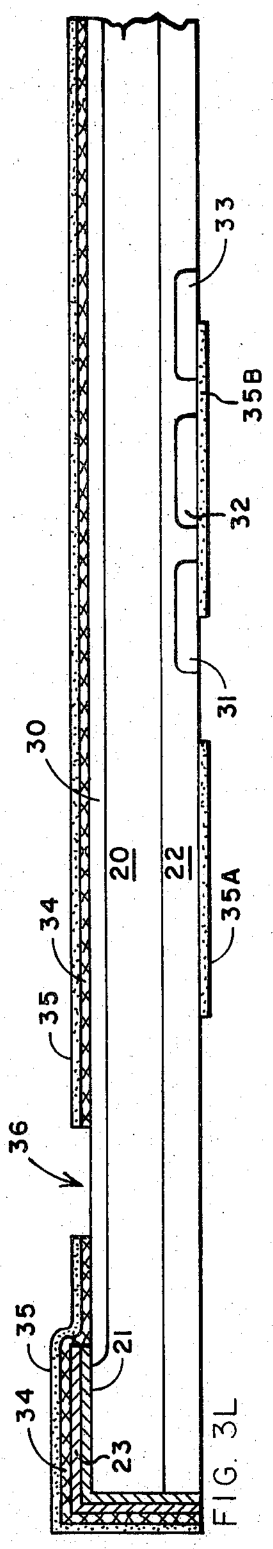

The next step is to strip off a portion of the oxide layer on the back surface, to leave only the capacitor dielectric 35A and the MOSFET bridge 35B on each element, FIG. 3K. A single window 36 is next cut in the front surface, FIG. 3L, through which the contact for the common anode may be made. After this front metal contact 37 and back metal contact 38 are deposited through appropriate metal masks, FIG. 3M, and alloyed to this silicon.

The necessary grid of grooves (for example groove 40) is now cut by a photolithographic masking and etching process: after this is done and the mask is removed the result is shown in FIG. 3N. Now a layer of metal such as platinum for the capacitor plate 42 and the MOSFET gates 43 and 44 is deposited through a suitable metal mask, FIG. 30, after which the entire surface including the grooves is given a coating 45 of $SiO_2$ by the low temperature process of cracking silane, FIG. 3P. The final step is to cut holes for four connections 46, 47, 50, and 51 at the back and one connection 52 at the front, as is shown in FIG. 3Q: this may be done with a hydrofluoric acid etch.

It will be readily understood that the various row and column cross conductors may be deposited on the chip by the same techniques utilized above, or may be made by discrete wire connections, at the choice of the user.

A line 3—3 has been drawn on FIG. 2 to identify the location of the section along which FIG. 3Q is taken. Elements 31, 22, and 32 make up a first MOSFET 38 having a gate 43, and elements 32, 22 and 33 make up a second MOSFET 39 having a gate 44. Element 32 acts as the source for the first MOSFET and also as the drain for the second MOSFET. These elements together make up a ladder array of transistors as described on page 51 of Electronics for Nov. 30, 1964.

The circuitry involved in this array will be best understood by reference first to FIG. 3Q, where a battery 60 is shown to have its negative terminal connected by conductors 61, 62, and 63 to common conductor 52. This terminal is also grounded at 64, and is connected through conductors 61 and 65 to a first output terminal 66. The positive terminal of battery 60 is connected through a load resistor 67 and conductor 70 to a second output terminal 71, and by conductors 72, 73, and 74 to contact 51.

Now when gate contacts 47 and 50 are both made negative simultaneously through row conductor 75 and column conductor 76, as will presently be explained, MOSFET's 39 and 38 provide a conductive path from conductor 51 to conductor 38, and the diode is back-biased. The depletion layer is displaced from the PN junction, as described in my prior patent referred to above, to some position indicated by the broken line 77, thus isolating the diode element from the other elements by reason of grooves V and H, and charging the inherent capacitance of the diode. The capacitor made up of conductor 42, insulation layer 35*a*, and the related portion of layer 22, also charges, through conductor 80, and the total charging current flows in load resistor 67.

If the negative connection to either MOSFET gate is broken, element 38 is isolated from the battery, and the inherent and discrete capacitors begin to discharge through the inherent resistor of the diode, the rate of discharge being determined by the light falling on the particular diode area. In the meantime other elements are connected in turn to the battery through conductors 83, 84 and are energized in a sequence determined by the MOSFET switches. It will be understood that the period required to scan the entire array is less than the interval required for the charge across the total capacitance to leak, through the lowest expected diode resistance, to a point where the back bias is insufficient to maintain the depletion layer 77 at a level sufficient to isolate the elements.

Turning again to FIG. 1, the reference numerals applied to diode element (*m,l*) in the upper left corner are those of FIG. 3Q. Also shown in FIG. 1 are ring counters 85 and 86 which generate the scanning signals for controlling the MOSFET switches of the various elements. Counter 85 is made up of as many stages as there are columns in the array, and counter 86 is made up of as many stages as there are rows. To avoid needless repetition in the drawing only the first and last stages of each counter are shown in detail.

The first stage of counter 85 is shown to comprise a flip-flop 100 and an AND gate 101. When flip-flop 100 is in its OFF condition no signal is supplied on a conductor 102 to the AND gate, and when the flip-flop is ON a negative signal is supplied to the AND gate as well as to column conductor 76. A similar situation exists for the other stages of counters 85 and 86.

Associated with the counters are a clock 103 which provides a continuous train of pulses on a clock bus 104 connected to the AND gates of counter 85, and a START signal source 105 which may be actuated to supply a signal on a START bus 106 connected to all the flip-flops of both counters. A START signal sets the first stage flip-flops of both counters into their ON positions, and sets all other flip-flops into their OFF positions.

The first stage of counter 85 supplies a signal on column conductor 76, and the first stage of counter 86 supplies a signal on row conductor 75'. This energizes both MOSFET's of element (*l,l*) and recharges the capacitors of the element, the charging current flowing through load resistor 67. No other element at this time has both its MOSFET's energized.

The next clock pulse enables only the AND gate of the first stage of counter 85, and its output is fed backward, at 107 to shut off its flip-flop, and fed forward, at 108 to turn on the second stage. This de-energizes the first column conductor 76, isolating element (l,l) and allowing the capacitance thereof to discharge through the diode, while at the same time energizing the second column conductor, and "reading" element (*l*,2). This process continues until element (*l,n*) is read. The output of the nth stage in counter 85 is fed forward at 110, to trigger the second stage in counter 86, backward at 111 to disable its own flip-flop, and backward at 112 to trigger the first stage in counter 85. This initiates reading the elements in row 2, and operation continues until element $(m,n)$ is read. The output of the $m$th AND gate is fed back at 113 to disable its own flip-flop, and backward at 114 to trigger the first flip-flop of counter 86, and the entire process repeats.

From the foregoing it will be evident that for properly scanning an array of $m \times n$ elements there need be, in addition to the positive and negative battery connections, only $m + n$ control conductors. The entire arrangement is integral, presents an unbroken surface to the light being observed, and requires no moving parts for its scanning function.

The foregoing description and the drawings are illustrative of my invention, which I now claim as follows:

1. In radiant energy responsive apparatus comprising a wafer of semiconductor material having a first thin layer of a first conductivity type on one side thereof for impingement by incident radiation and a second thicker layer of opposite conductivity type on the other side thereof to define therebetween a PN junction and an intrinsic junction depletion layer functioning inherently as a capacitor shunting a diode and a resistor of which the resistance decreases with increase in incident radiation, a plurality of intersecting grooves penetrating into said second layer to a depth insuffcent to reach said depletion layer so as to divide said second layer into a plurality of detection elements, first conducting means for making electrical connection to all said elements, second conducting means for making electrical connection to said first layer, and reverse biasing means connected to said first and second conducting means and of magnitude sufficient to broaden said depletion layer until said grooves do penetrate it, so as to mutually isolate said elements electrically, the improvement which comprises:

switching means integrated into each said element and forming part of said first conducting means, each said switching means having a first switching condition, in which the element is connected to said biasing means so that current flows to charge the inherent capacitor to a potential determined by said biasing means, and a second switching condition, in which the element is isolated from said biasing means so that the inherent capacitor may discharge, through the inherent resistance, at a rate determined by the incident radiation, and means energizing the switching means of said elements into said first switching conditions singly in a predetermined repeating sequence of operations.

2. Apparatus according to claim 1 in which the reverse biasing means includes means giving an output representative of the current flow resulting from each operation of the last named means.

3. Apparatus according to claim 1 in which the switching means includes at least one field effect transistor comprising a pair of spaced areas of heavily doped material of said first conductivity type formed in said second layer to act as source and drain electrodes, means conductively connecting one of said areas to said second layer, further means for connecting the other of said areas to said reverse biasing means, and a gate electrode overlying the space between said areas and connected to the switch energizing means.

4. Apparatus according to claim 3 in which the further means comprises a second field effect transistor having a gate electrode connected to the switch energizing means.

5. Apparatus according to claim 1 in which the switching means comprises a ladder array of field effect transistors having gate electrodes connected to said switch energizing means.

6. Apparatus according to claim 1 in which the switching means comprises pairs of field effect transistors, and in which the last named means comprises a ring counter, means interconnecting the first transistors of said elements by columns and the second transistors of said elements by rows, and means energizing the rows and columns interconnecting conductors from successive stages of said ring counter.

7. Apparatus according to claim 1 together with a discrete capacitor formed on said second surface of each said element and connected in parallel with the inherent capacitance of said depletion layer.

8. A photodiode comprising, in combination:

a wafer of lightly doped semiconductor material of a first conductivity type;

a first, thin, heavily doped layer of the second conductivity type on one side of said wafer to coact with said material as a photodiode;

a second heavily doped layer of the first conductivity type on the other side of said wafer;

a pair of closely spaced, heavily doped, mutually adjacent limited areas of the second conductivity type embedded in the surface of said second layer to function as the drain and source of a field effect transistor;

means ohmically connecting one of said areas to said second layer;

electrode means insulated from and overlying the portion of said second layer between said areas to act as a gate electrode for said transistor for controlling the flow of current between said areas; and means, including a load impedence, for supplying a biasing voltage of reverse polarity between said first layer and the other of said layers, whereby impingement of radiation upon said first layer may affect the current through said load impedence.

* * * * *